US011234235B2

(12) United States Patent
McConnell et al.

(10) Patent No.: US 11,234,235 B2
(45) Date of Patent: Jan. 25, 2022

(54) RESOURCE DISTRIBUTION HUB GENERATION ON A MOBILE DEVICE (71) Applicant: BANK OF AMERICA CORPORATION, Charlotte, NC (US)

(72) Inventors: Patrick Thomas McConnell, Huntersville, NC (US); William Bradley Burks, Charlotte, NC (US); Daniel James Doherty, Huntersville, NC (US); Justin Riley duPont, Charlotte, NC (US); Thomas Elliott, Redwood City, CA (US); Tony England, Tega Cay, SC (US); Matthew Murphy, Charlotte, NC (US); Nickolas Patrick Parker, Charlotte, NC (US); Stephen Philip Selfridge, Huntersville, NC (US); Steven Michael Twombly, Saco, ME (US); James J. Williams, Lincoln University, PA (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 149 days.

(21) Appl. No.: 16/399,874

(22) Filed: Apr. 30, 2019

(65) Prior Publication Data
US 2020/0351852 A1 Nov. 5, 2020

(51) Int. Cl.
H04W 72/04 (2009.01)
H04W 4/80 (2018.01)
(Continued)

(52) U.S. Cl.
CPC ......... H04W 72/044 (2013.01); G06F 9/5011 (2013.01); H04W 4/80 (2018.02); H04W 12/068 (2021.01)

(58) Field of Classification Search
CPC . H04W 72/044; H04W 4/80; H04W 12/0608; G06F 9/5011
See application file for complete search history.

(56) References Cited

U.S. PATENT DOCUMENTS 919,598 A 4/1909 Kuebler
954,785 A 4/1910 Craven
(Continued)

FOREIGN PATENT DOCUMENTS

CA 2338447 A1 2/2000
CN 204759477 U 11/2015
(Continued)

OTHER PUBLICATIONS

Demystifying Authentication Concepts in Smartphones: Ways and Types to Secure Access by Gasparetti (Year: 2017).

Primary Examiner — Austin J Moreau
(74) Attorney, Agent, or Firm — Moore & Van Allen PLLC; Nicholas C. Russell (57) ABSTRACT Embodiments of the present invention provide systems, apparatus, methods and/or the like for generating a resource distribution hub using for fully electronic resource distribution by using mobile device application designed to interface with an embedded Near-Field Communication (NFC) tag in a resource distribution instrument that stores instructions for processing the resource distribution authorization information. The holder (i.e., resource provider) of the resource distribution instrument can use the resource distribution instrument to communicate to a mobile communication device having an NFC reader to read the instructions and process a resource distribution according to the parameters of the mobile device application. As such, the holder (i.e., resource provider) of the resource distribution request can process the resource distribution without having to issue a (Continued)

credentials, aliases, pin codes, and the like conventionally used to authorizes the distribution of resources to the resource requester.

20 Claims, 4 Drawing Sheets

(51) Int. Cl.
   *G06F 9/50* (2006.01)
   *H04W 12/06* (2021.01)

(56) References Cited

U.S. PATENT DOCUMENTS

| | | | |
|---|---|---|---|
| 4,613,269 | A | 9/1986 | Wilder et al. |
| 4,862,160 | A | 8/1989 | Ekchian et al. |
| 5,386,564 | A | 1/1995 | Shearer et al. |
| 5,396,630 | A | 3/1995 | Banda et al. |
| 5,892,946 | A | 4/1999 | Woster et al. |
| 5,977,875 | A | 11/1999 | Lin et al. |
| 6,134,559 | A | 10/2000 | Brumme et al. |
| 6,226,792 | B1 | 5/2001 | Goiffon et al. |
| 6,597,801 | B1 | 7/2003 | Cham et al. |
| 6,895,486 | B2 | 5/2005 | Wong et al. |
| 6,918,541 | B2 | 7/2005 | Knowles et al. |
| 6,941,285 | B2 | 9/2005 | Sarcanin |
| 6,968,439 | B2 | 11/2005 | Wong et al. |
| 7,346,900 | B2 | 3/2008 | Souloglou et al. |
| 7,362,219 | B2 | 4/2008 | Nogami et al. |
| 7,668,406 | B2 | 2/2010 | Schnee et al. |
| 7,822,688 | B2 | 10/2010 | Labrou et al. |
| 7,844,582 | B1 | 11/2010 | Arbilla et al. |
| 7,886,156 | B2 | 2/2011 | Franchi |
| 8,117,085 | B1 | 2/2012 | Smith |
| 8,332,272 | B2 | 12/2012 | Fisher |
| 8,346,210 | B2 | 1/2013 | Balsan et al. |
| 8,346,857 | B2 | 1/2013 | Denker et al. |
| 8,352,323 | B2 | 1/2013 | Fisher |
| 8,423,466 | B2 | 4/2013 | Lanc |
| 8,630,905 | B2 | 1/2014 | Fisher |
| 8,662,401 | B2 | 3/2014 | Skowronek et al. |
| 8,705,873 | B2 | 4/2014 | Voloshynovskiy et al. |
| 8,751,313 | B2 | 6/2014 | Fisher |
| 8,751,314 | B2 | 6/2014 | Fisher |
| 8,805,739 | B2 | 8/2014 | Brown et al. |
| 8,864,024 | B1 | 10/2014 | Cummins et al. |
| 9,015,066 | B2 | 4/2015 | Scipioni et al. |
| 9,117,237 | B2 | 8/2015 | Levitt et al. |
| 9,189,783 | B2 | 11/2015 | Chowdhury et al. |
| 9,218,624 | B2 | 12/2015 | Moghadam |
| 9,367,921 | B2 | 6/2016 | Boardman et al. |
| 9,379,841 | B2 | 6/2016 | Fine et al. |
| 9,384,480 | B2 | 7/2016 | Jain |
| 9,396,467 | B2 | 7/2016 | Chiang |
| 9,563,890 | B2 | 2/2017 | Zhou |
| 9,767,442 | B2 | 9/2017 | Killian et al. |
| 9,785,940 | B2 | 10/2017 | deOliveira et al. |
| 9,824,349 | B2 | 11/2017 | Xing et al. |
| 9,824,355 | B2 | 11/2017 | Aabye et al. |
| 9,830,589 | B2 | 11/2017 | Xing |
| 9,836,744 | B2 | 12/2017 | Fisher |
| 9,904,923 | B2 * | 2/2018 | Mattsson ............... H04W 12/02 |
| 9,911,116 | B1 | 3/2018 | Lewis et al. |
| 9,953,308 | B2 | 4/2018 | King |
| 9,984,360 | B2 | 5/2018 | Jooste |
| 9,985,699 | B1 | 5/2018 | Cronin |
| 10,083,447 | B1 | 9/2018 | Chiarella et al. |
| 10,127,541 | B2 * | 11/2018 | Abifaker ................ G06Q 20/32 |
| 10,128,914 | B1 | 11/2018 | Calabrese |
| 10,140,603 | B2 | 11/2018 | Fisher |
| 10,152,706 | B2 | 12/2018 | Caceres et al. |
| 10,528,776 | B1 * | 1/2020 | Levy ................. G06Q 30/0609 |
| 2005/0140495 | A1 | 6/2005 | Yamazaki et al. |
| 2009/0043681 | A1 | 2/2009 | Shoji et al. |
| 2009/0112765 | A1 | 4/2009 | Skowronek |
| 2010/0211504 | A1 | 8/2010 | Aabye et al. |
| 2010/0217682 | A1 | 8/2010 | Chan |
| 2011/0320293 | A1 | 12/2011 | Khan |
| 2012/0011063 | A1 | 1/2012 | Killian et al. |
| 2012/0246079 | A1 | 9/2012 | Wilson et al. |
| 2012/0303496 | A1 | 11/2012 | Musfeldt |
| 2013/0020389 | A1 | 1/2013 | Barnett |
| 2013/0134216 | A1 | 5/2013 | Spodak et al. |
| 2013/0303496 | A1 | 11/2013 | Cox et al. |
| 2014/0136405 | A1 | 5/2014 | DuCharme et al. |
| 2014/0136759 | A1 | 5/2014 | Sprouse et al. |
| 2014/0214678 | A1 | 7/2014 | Williams et al. |
| 2014/0256251 | A1 | 9/2014 | Caceres et al. |
| 2015/0350177 | A1 | 12/2015 | Sharp et al. |
| 2016/0012465 | A1 | 1/2016 | Sharp |
| 2016/0055513 | A1 | 2/2016 | Kuhn et al. |
| 2016/0155111 | A1 | 6/2016 | Arnald et al. |
| 2016/0164680 | A1 | 6/2016 | Liao et al. |
| 2016/0307186 | A1 | 10/2016 | No et al. |
| 2017/0169422 | A1 | 6/2017 | Ye et al. |
| 2017/0185993 | A1 | 6/2017 | Sawant et al. |
| 2017/0255920 | A1 | 9/2017 | Prakash et al. |
| 2017/0262822 | A1 | 9/2017 | Conyers |
| 2017/0262832 | A1 | 9/2017 | Deshpande et al. |
| 2017/0352035 | A1 | 12/2017 | Geraud |
| 2017/0364895 | A1 | 12/2017 | Van Heerden et al. |
| 2017/0372289 | A1 | 12/2017 | Fitzsimmons et al. |
| 2018/0025348 | A1 | 1/2018 | Shauh et al. |
| 2018/0103112 | A1 | 4/2018 | Jones-Mcfadden et al. |
| 2018/0204195 | A1 * | 7/2018 | Kang ................. G06Q 20/351 |
| 2018/0211248 | A1 | 7/2018 | Sims et al. |
| 2018/0315048 | A1 | 11/2018 | Xiu et al. |
| 2018/0365661 | A1 * | 12/2018 | Levi ...................... G06Q 20/36 |
| 2019/0009168 | A1 | 1/2019 | Aman et al. |
| 2019/0042816 | A1 | 2/2019 | McQuade et al. |
| 2019/0043052 | A1 | 2/2019 | Ledford et al. |
| 2019/0095925 | A1 | 3/2019 | Gabriele et al. |
| 2019/0199714 | A1 | 6/2019 | Kamal et al. |
| 2020/0092087 | A1 | 3/2020 | Hillan et al. |
| 2020/0104820 | A1 * | 4/2020 | Dsouza ................ G06Q 20/405 |
| 2020/0302436 | A1 * | 9/2020 | Ilincic ................ G06Q 20/3829 |
| 2021/0166215 | A1 * | 6/2021 | Aleksandrov ......... H04L 9/0643 |

FOREIGN PATENT DOCUMENTS

| | | |
|---|---|---|
| ES | 2677320 T3 | 8/2018 |
| WO | 2013155563 A1 | 10/2013 |

\* cited by examiner

RESOURCE DISTRIBUTION HUB GENERATION ON A MOBILE DEVICE

FIELD OF THE INVENTION

The present invention is generally directed to electronic resource distribution and, more specifically, facilitating a resource distribution by providing a system and methods for Near-Field Communication (NFC) between a mobile device application environment and a user.

BACKGROUND

Many resource distributions are conducted in a conventional fashion in which a resource requester/recipient presents, and a resource provider collectively initiate and request authorization of the resource distribution with the use of specific credentials and/or aliases. However, a need exists to develop systems, apparatus computer program products, methods or the like that eliminate the need for the resource requester/recipient to present a resource distribution request and/or for the resource provider to issues a physical resource distribution document, resource distribution credentials, and/or provider aliases configured to authorize distribution of the resources. A further need exists to provide a fully automated means for the resource requester/recipient and/or resource provider to transition from the use conventional resource distribution authorization methods such that subsequent resource distributions are conducted in a fully electronic manner absent the need to exchange physical resource distribution request and resource distribution documents, credentials, and aliases.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, apparatus, methods and/or the like for generating a resource distribution hub using for fully electronic resource distribution by using mobile device application designed to interface with an embedded Near-Field Communication (NFC) tag in a resource distribution instrument that stores instructions for processing the resource distribution authorization information. The holder (i.e., resource provider) of the resource distribution instrument can use the resource distribution instrument to communicate to a mobile communication device having an NFC reader to read the instructions and process a resource distribution according to the parameters of the mobile device application. In specific embodiments of the invention, the instructions may provide for launching an application of the mobile communication device that automates the completion of the electronic resource distribution. While in other embodiments of the invention, the instructions may provide for loading the resource distribution request in a resource distribution application or online portal for resource provider to authorize the electronic resource distribution. As such, the holder (i.e., resource provider) of the resource distribution request can process the resource distribution without having to issue a credentials, aliases, pin codes, and the like conventionally used to authorizes the distribution of resources to the resource requester.

The present invention is generally directed to systems, methods, and computer program products for providing a mobile application on a mobile device for configuring resource distribution parameters; receiving instructions for a resource distribution via the mobile application on the mobile device, wherein the instructions contain a resource distribution amount; activating a near field communication transmitter on the mobile device to initiate a near field communication; generating a communicable linkage via the near field communication between the mobile device and a resource distribution instrument, with an embedded near field communication tag; receiving resource distribution credentials from the resource distribution instrument via the near field communication transmitter on the mobile device; authenticating the resource distribution credentials; and initiating a request for resource distribution for the resource distribution amount.

In some embodiments, authenticating the resource distribution credentials further comprises verifying a resource account associated with the resource distribution credentials.

In some embodiments, authenticating the resource distribution credentials further comprises: transmitting the resource distribution credentials to an entity; and receiving, from the entity, confirmation of a resource account and real-time approval of the request for resource distribution.

In some embodiments, the invention is further configured to tokenize the resource distribution credentials received from the resource distribution instrument.

In some embodiments, authenticating the resource distribution credentials further comprises: transmitting, via the mobile device, the tokenized resource distribution credentials to an entity; and receiving, via the mobile device, a one-time authorization from the entity for the resource distribution amount based on the tokenized resource distribution credentials.

In some embodiments, tokenizing the resource distribution credentials further comprises: encrypting the resource distribution credentials via the mobile device; transmitting, via the mobile device, the encrypted resource distribution credentials to an entity for tokenization; and receiving the tokenized resource distribution credentials from the entity.

Thus, according to embodiments of the invention, which will be discussed in greater data below, the present invention provides for facilitating an electronic resource distribution through NFC communication using a mobile device application. The present invention eliminates the need for a resource provider to issue a physical resource distribution document/instrument and/or the need for the resource requester to present a resource distribution request for future resource distributions between the resource requester and resource provider.

The features, functions, and advantages that have been discussed may be achieved independently in various embodiments of the present invention or may be combined with yet other embodiments, further data of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, systems, apparatus, and methods are described in data below for generating a resource distribution hub using for fully electronic resource distribution by using mobile device application designed to interface with an embedded Near-Field Communication (NFC) tag in a resource distribution instrument that stores instructions for processing the resource distribution authorization information. The holder (i.e., resource provider) of the resource distribution instrument is able to use the resource distribution instrument to communicate to a mobile communication device having an NFC reader to read the instructions and process a resource distribution according to the parameters of the mobile device application. In specific embodiments of the invention, the instructions may provide for launching an application of the mobile communication device or user device that automates the completion of the electronic resource distribution by interfacing with an NFC-enabled resource distribution instrument. While in other embodiments of the invention, the instructions may provide for loading the resource distribution request in a resource distribution application or online portal for resource provider to authorize the electronic resource distribution. As such, the holder (i.e., resource provider) of the resource distribution request is able to process the resource distribution without having to provide credentials, aliases, pin codes, and the like, which are conventionally used to authorize the distribution of resources to the resource requester.

The information transmitted by NFC from the resource distribution instrument to the NFC reader on the mobile communication device or user device may be tokenized resource distribution authentication and distribution authorization information. In this way, the information is securely transferred between parties. The NFC tokenization process may substitute sensitive information such as account numbers, aliases, pin codes, and the like with a randomly generated string of digits that replace the sensitive information with a random number or token that represents the sensitive information to the parties involved in the resource distribution process. Because the token is simply a random number, and not the original sensitive information itself, anyone intercepting or eavesdropping on the resource distribution interaction may feasibly be able to retrieve the token, but the token would be useless outside of the particular resource distribution currently taking place between the parties. In addition to the tokenized information, the user device, either in local memory or via cloud-supported configuration, may generate a dynamic card verification value ("dCVV"). This dCVV is a cryptographic value that is unique to the single resource distribution and can be used only once. An unauthorized party intercepting the token and the dCVV might attempt to use the token for some nefarious purpose, but the dCVV's lifespan is so short that the amount of damage is significantly less than if the unauthorized party had gained access to the sensitive information instead. And because the token is tied to a specific user device, it cannot be used to prepare a resource distribution instrument and cannot be used to initiate a remote resource distribution via the web. Any resource distribution that includes the token but does not originate from the proper user device is declined as unauthorized. In addition to thwarting unauthorized interception of sensitive information by third parties, this configuration also provides confidence to the resource provider that sensitive information is not being logged or stored by the resource requester, since the information transacted between the parties is a one-time-use credential. Conventional systems may incorporate other forms of resource distribution authorization on a mobile communication device or user device, such as a dongle that allows for swiping of card information to be transmitted via the user device. In such instances, the resource provider has no assurance that the swiping mechanism used by the resource requester is legitimate or that the information gleaned from the swiping mechanism is not being stored for later use. As such, the present invention provides added reassurance to the resource provider by eliminating the need for collecting sensitive information during a mobile point-of-sale scenario.

Figure 1:
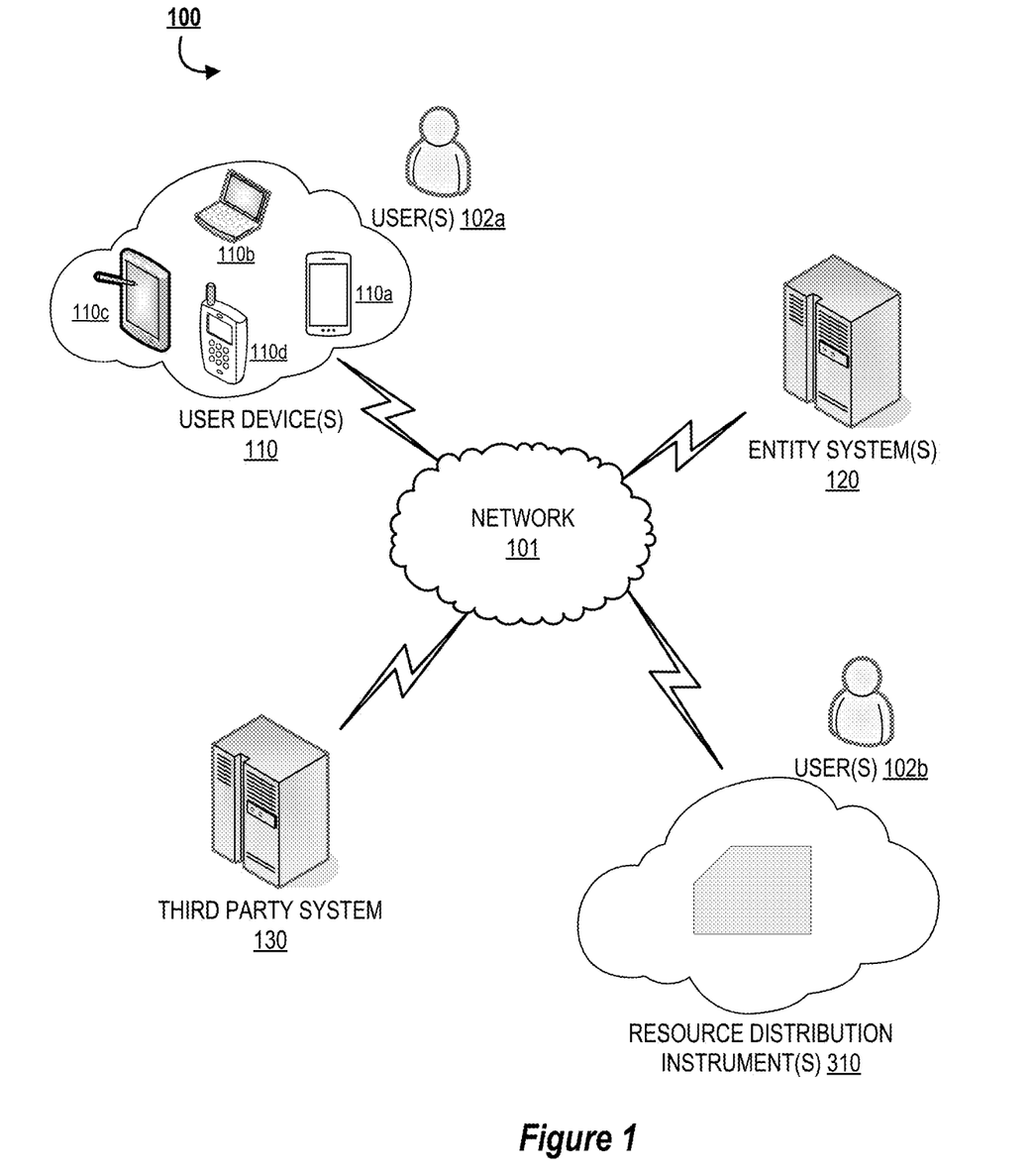
FIG. 1 illustrates a system environment for resource distribution hub generation on a mobile device, in accordance with some embodiments of the present invention.

As used herein, the term "user" may refer to any entity or individual associated with the system. In some embodiments, a user may be a computing device user, a phone user, a mobile device application user, a customer of an entity or business, a system operator, and/or employee of an entity (e.g., a financial institution). In a specific embodiment, a user may be a managing user of the resource distribution hub mobile system, wherein the system enables the user to reconfigure the parameters of the mobile hub or the provided mobile application. In another specific embodiment, a user may be a resource provider or customer accessing a user account via an associated user device or providing an NFC-enabled resource distribution instrument, wherein data from an interaction between the user and an entity is analyzed or processed by the system. In other embodiments, the user may be a resource requester wherein the user accesses the resource distribution hub via an associated user device to accept payment or distribution of resources from a resource provider or customer. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like). The terms "user 102a" and "user 102b" are used herein to refer to multiple users 102 that may be using different devices to communicate during a resource distribution or transaction, but the term user is understood to collectively and generally refer to any user interacting with the system environment 100.

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, or any combination of the aforementioned. The device may be used by the user to access the system directly or through an application, online portal, internet browser, virtual private network, or other connection channel.

As used herein, the term "entity" may be used to include any organization or collection of users that may interact with the system. An entity may refer to a business, company, or other organization that either maintains or operates the system or requests use and accesses the system. In one embodiment, the entity may be a software development entity or data management entity. The terms "financial institution" and "financial entity" may be used to include any organization that processes financial transactions including, but not limited to, banks, credit unions, savings and loan associations, investment companies, stock brokerages, management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

As used herein, the term "third party system" may be used to include any organization or collection of users that may interact with the system or support the completion of a resource distribution. A third party system may refer to a business, company, or other organization that either maintains or operates a separate system or requests use of and access to the system. In one embodiment, the third party system may be a software development entity or data management entity. In another embodiment, the third party system may be a resource distribution or payment processing system that validates authentication information from a resource provider or maintains an account for a resource provider or user that is interacting with the system. The third party system may also provide a cloud-based service over a network to provide a back-end authentication system for tokenization of resource distribution information, such as a dCVV technology.

As used herein, "authentication information" may refer to any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system.

FIG. 1 illustrates a system environment for resource distribution hub generation on a mobile device, in accordance with some embodiments of the present invention. As illustrated in FIG. 1, entity system 120 is operatively coupled, via a network 101, to the user device(s) 110 (e.g., a plurality of user devices 110a, 110b, 110c, and 110d), and third party system 130. While only one third party system 130 is depicted in the embodiment shown in FIG. 1, it is understood that the network 101 may interconnect entity system 120, and user device 110 with multiple third party systems 140. In this way, the entity system 120 can send information to and receive information from the user device 110, and the third party system 130. In the illustrated embodiment, the plurality of user devices 110a-110d provide a plurality of communication channels through which the entity system 120 and third party system 130 may communicate with the user 102 over the network 101, such as through a mobile device 110a, personal computer 110b, tablet 110c, and cellular device 110d or any combination thereof.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. In some embodiments, the network 101 may use a near field communication protocol to complete a communication between devices of a first user (e.g. user 102a) and a second user (e.g. user 102b). The system can initiate, process or document a resource distribution between the users 102. The network 101 may provide for wireline, wireless, or a combination wireline and wireless communication between devices on the network 101.

In some embodiments, the user 102 is an individual interacting with the entity system 120 via a user device 110, while in other some embodiments a user 102 is a user requesting service from the entity (e.g., customer service) or interacting with an account maintained by the entity system 120. Multiple users 102 are contemplated in certain embodiments, wherein one user 102 uses a user device 110 to communicate with other users 102, the entity system 120, or third party system 103, and one or more additional users 102 communicate use a resource distribution instrument to communicate with other users 102, entity systems 120, and third party systems 130. In an alternative embodiment, the user 102 is a user interacting with, maintaining, or employing a resource generation hub application, wherein the system enables the user to reconfigure the application based on user-specified criteria and policies.

Figure 2:
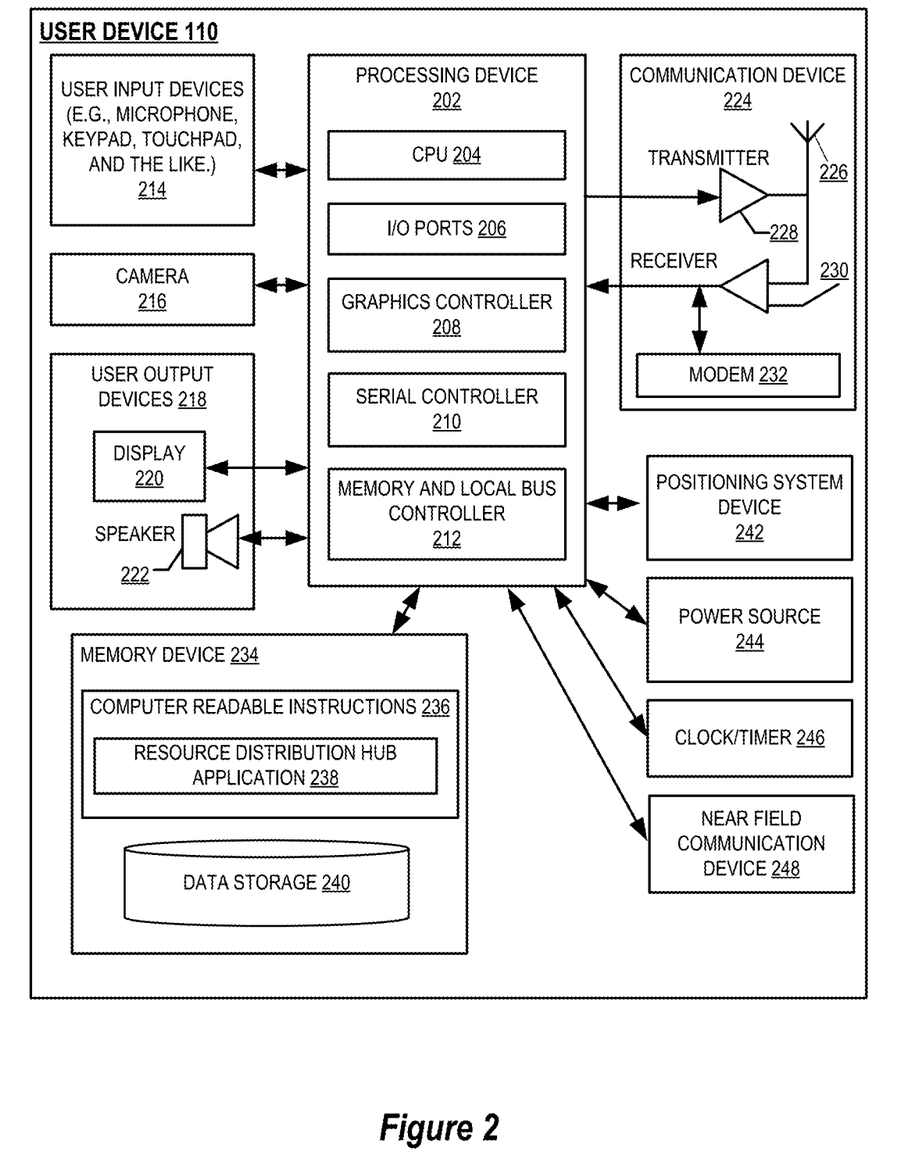
FIG. 2 illustrates a block diagram of a user device with integrated NFC technology, in accordance with embodiments of the present invention.

FIG. 2 provides a block diagram of a user device 110, in accordance with one embodiment of the invention. The user device 110 may generally include a processing device or processing device 202 communicably coupled to devices such as, a memory device 234, user output devices 218 (for example, a user display device 220, or a speaker 222), user input devices 214 (such as a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the resource distribution hub application 238. The resource distribution hub application 238 may then allow the user device 110 to transmit and receive data and instructions from the other devices and systems of the system environment 100, as well as resource distribution instruments that contain NFC communication capability. The user device 110 comprises computer-readable instructions 236 and local data storage 240 stored in the memory device 234, which in one embodiment includes the computer-readable instructions 236 of a resource distribution hub application 238. In some embodiments, the resource distribution hub application 238 allows a user 102 to access and/or interact with other systems such as the entity system 120.

The processing device 202 may be configured to use the communication device 224 to communicate with one or more other devices on a network 101 such as, but not limited to the entity system 120 and the third party system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance with networks to utilize audio frequency, ultrasound frequency, or other communication/data networks.

The user device 110 may also include a memory buffer, cache memory or temporary memory device operatively coupled to the processing device 202. Typically, one or more applications are loaded into the temporarily memory during use. As used herein, memory may include any computer readable medium configured to store data, code, tokenization information, dCVV information, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like. The user device 110 also includes a near field communication (NFC) device 248 that allows the user device 110 to communicate with other NFC-enabled devices or resource distribution instruments. In this way, the user device 110 may receive resource distribution information from a resource distribution instrument wirelessly via NFC protocols in a contactless manner. The NFC-enabled user device 110 is configured such that the resource distribution hub application 238 may receive information from an NFC-compliant apparatus. In some embodiments, the NFC channel between the user device 110 and any other NFC-enabled device or instrument may be secured by applying encryption algorithms.

Though not shown in detail, the system further includes one or more entity systems 120 (as illustrated in FIG. 1) which is connected to the user device 110 and which may be associated with one or more entities, institutions or the like. In this way, while only one entity system 120 is illustrated in FIG. 1, it is understood that multiple networked systems may make up the system environment 100. The entity system 120 generally comprises a communication device, a processing device, and a memory device. The entity system 120 comprises computer-readable instructions stored in the memory device, which in one embodiment includes the computer-readable instructions of an entity application. The entity system 120 may communicate with the user device to provide access to user accounts stored and maintained on the entity system 120. In some embodiments, the entity system 120 may communicate with the user device 110 during an interaction with a user 102 in real-time, wherein user interactions may be monitored and processed by the entity system 120 to analyze authentication information or reconfigure the resource distribution hub application 238 according to changes in a received or monitored data stream.

Figure 3:
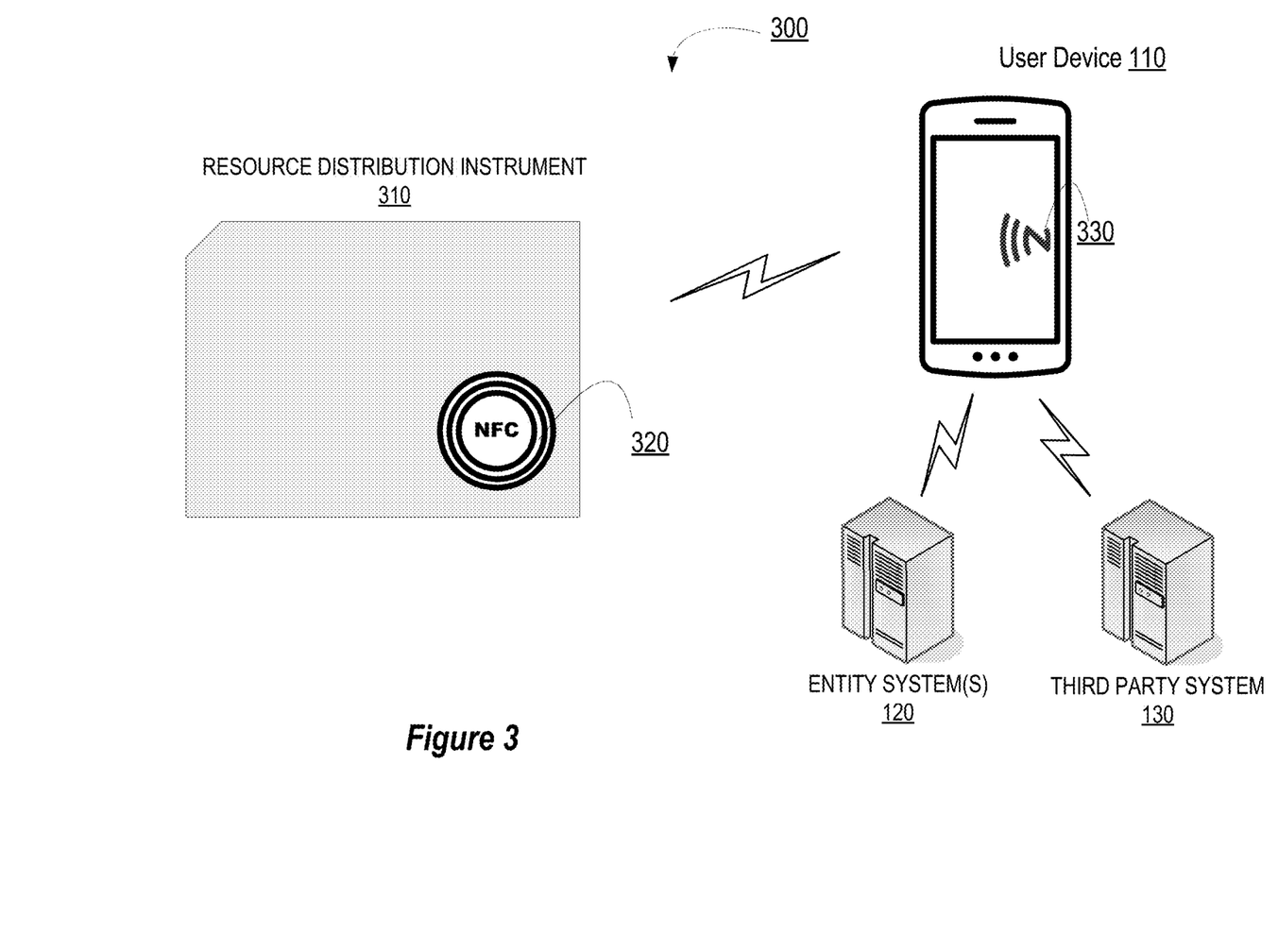
FIG. 3 illustrates a communication configuration 300 for NFC communication between a resource distribution instrument and user device, in accordance with embodiments of the present invention.

FIG. 3 illustrates a communication configuration 300 for NFC communication between a resource distribution instrument 310 and user device 110, in accordance with embodiments of the present invention. As shown, the resource distribution instrument 310 contains an NFC tag 320, which enables a short-range wireless communication with other NFC-enabled devices. In some embodiments, the NFC tag requires a separation of 10 cm or less and operates at or around 13.56 MHz on International Organization for Standardization/International Electrotechnical Commission (ISO/IEC) 18000-3 air interface and at rates ranging from 106 kbit/s to 424 kbit/s. The NFC communication may involve an initiator and a target, and the initiator actively generates a radio frequency field that can power a passive target. This enables NFC targets, such as the resource distribution instrument, to take very simple form factors such as unpowered tags, stickers, key fobs, or cards. NFC offers a low-speed connection with simple setup that can be used to bootstrap more capable wireless connections. For example, software may use NFC to enable pairing and establish a Bluetooth connection when doing a file transfer and then disabling Bluetooth on both devices upon completion. The same principle can be applied to the configuration of Wi-Fi networks, wherein devices may use NFC to share MAC Address and IP addresses and then use Wi-Fi to share files and documents. In some embodiments, the NFC communication between the resource distribution instrument 310 and user device 110 may be bootstrapped to initiate a higher speed connection between the user device 110 of a resource requester, or user 102a, and a second user device 110 of a resource provider or user 102b.

As shown, the user device 110 is configured to provide an NFC initiation signal 330 to initiate the NFC communication with the resource distribution instrument 310. The user 102a may use the resource distribution hub application 238 on the user device 110 to cause the user device 110 to execute computer readable instructions 236 in order to activate the NFC communication device 248 on the user device 110. For example, in some embodiments, the user 102a may be the resource requester in a transaction. Using the resource distribution hub application 238 on the user device 110, the user 102a can dictate an amount of resources to be transferred from the user 102b. At this point, the user 102a may initiate an NFC communication via the resource distribution hub application. The user 102b may present the resource distribution instrument 310 which contains NFC tag 320, at which point information may be transferred from the resource distribution instrument 310 to the user device 110, allowing the resource distribution to take place without a need for the user 102b to provide any additional sensitive information credentials, aliases, pin codes, and the like. Furthermore, the wireless NFC communication channel between resource distribution instrument 310 and the user device 110 allows the user 102b to avoid physically handing the resource distribution instrument 310 to user 102a, thereby lowering the chance that the user 102a or another third party may read sensitive account information that may be printed on the resource distribution instrument 310.

As discussed previously, the user device 110 may also tokenize the information received form the resource distribution instrument 310 via a protocol such as dCVV in order to complete the resource distribution. The user device 110 may communicate with entity systems 120 or third party systems 130 at which an account may be maintained for the user 102b in order to authenticate the resource distribution. In some embodiments, the dCVV information may be stored locally on the user device 110, while in other embodiments, the tokenization information may be processed and stored by an authenticating party such as entity system 120 or third party system 130, which may then encrypt and transfer the information back to user device 110 during the resource distribution.

Figure 4:
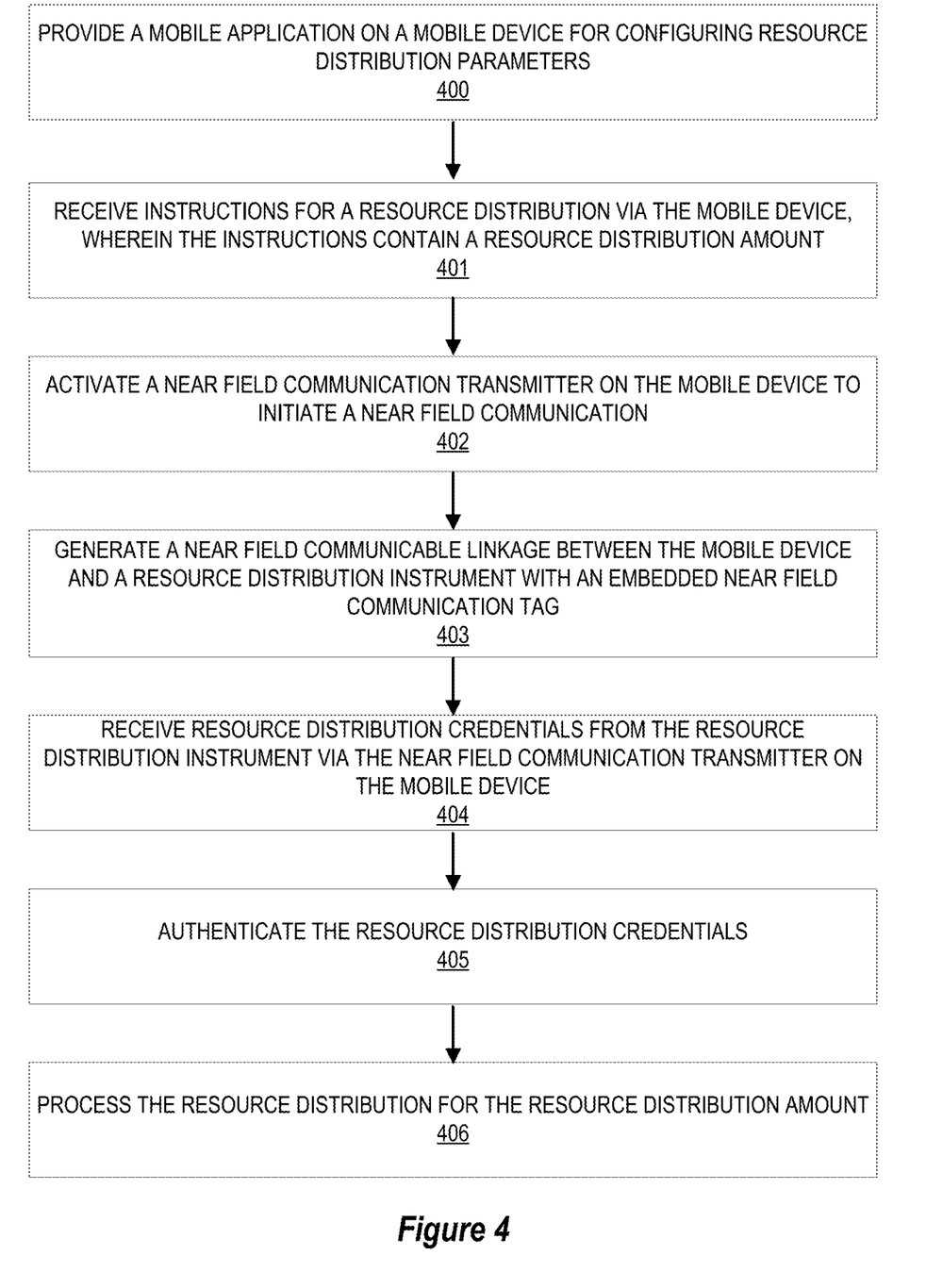
FIG. 4 illustrates a high-level process flow for mobile resource distribution hub generation and implementation, in accordance with an embodiment of the present invention.

FIG. 4 illustrates a high level process flow for mobile resource distribution hub generation and implementation, in accordance with an embodiment of the present invention. As shown, the process begins at block 400, where the mobile application, previously described as resource distribution hub application 238, is provided on the mobile device, or user device 110. The resource distribution hub application 238 may be provided in any number of graphical user interface embodiments, but generally is meant to include a point-of-sale style interface configured to process and store transaction information and data associated with the sale of services and goods and the transfer of resources associated therewith. As such, the resource distribution hub application is designed to provide resource distribution amounts, payment type selection, and may interface with the data storage 240 of the mobile device to locally store resource distribution information such as past transactions, product identification codes, product stock amounts, and the like. In some embodiments, this information may be stored on and managed by entity systems 120 or third party systems 130, such that the user device 110 may access the information on an as-needed basis and receive updated product information, pricing information, resource distribution information, and account information in real-time.

As shown in block 401, the mobile device, such as user device 110, is configured to receive instruction for a resource distribution, wherein the instruction contain a resource distribution amount. For instance, the mobile device may receive input from the user 102 that a transaction is to be completed. The user device 110 may look up the amount of resources required to complete the transaction, either on the local data storage 240 or by communication over network 101 with entity systems 120 or third party systems 130 to determine the proper resource distribution amount. Next, the system activates a near field communication device 248 on the user device 110 to initiate a near field communication, as shown in block 402. This allows the user device 110 to generate a near-field communicable linkage with a resource distribution instrument that contains an embedded NFC tag, such as an NFC enabled credit card or NFC enabled device that the resource provider may have, as shown in block 403. In certain embodiments where the user device is communicating with an NFC enabled device capable of other communication means, the NFC protocol may be piggybacked as discussed previously to support a higher data rate transfer via a second protocol such as WiFi or Bluetooth.

Next, the user device 110 receives the resource distribution credentials from the resource distribution instrument via the NFC transmitter, or NFC communication device 248, on the user device 110, as shown in block 404. The resource distribution credentials may then be authenticated, as shown in block 405, and finally the resource distribution hub may process the resource distribution for the resource distribution amount, as shown in block 406. Authentication of the resource distribution credentials may be achieved in a variety of ways. For instance, the resource distribution credentials may be tokenized by the resource distribution hub application 238, and stored locally on the user device 110 or transmitted to entity systems 120 or third party systems 130 for verification of a resource account associated with the resource distribution credentials. In other embodiments, the resource distribution credentials may be encrypted by the resource distribution hub application 238 before being transmitted to an entity for tokenization and verification. In any instance, the resource distribution hub application 238 may communicate with an entity such as entity systems 120 or third party systems to verify that there is an account associated with the resource distribution credentials and may receive real-time information indicating that there are available resources in an associated resource account to satisfy the resource distribution amount. In some embodiments, the resource distributions hub application may also receive information such as a phone number, email address, or other communication details associated with the resource account or the resource distribution credentials. This information may be used by the resource distribution hub application 238 to generate a message confirming completion of the resource distribution or transaction, which may be transmitted by the user device 110 to verify completion.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 16/399,873 | SYSTEM FOR SECURE CONTACTLESS DISTRIBUTION OF DYNAMIC RESOURCES | Apr. 30, 2019 |
| 16/399,877 | SYSTEM FOR SECONDARY AUTHENTICATION VIA CONTACTLESS DISTRIBUTION OF DYNAMIC RESOURCES | Apr. 30, 2019 |
| 16/399,709 | EMBEDDED TAG FOR RESOURCE DISTRIBUTION | Apr. 30, 2019 |
| 16/399,767 | RESOURCE DISTRIBUTION INSTRUMENTS WITH EMBEDDED CODES OR COMMUNICATION DEVICES | Apr. 30, 2019 |

What is claimed is:

1. A system for resource distribution hub generation on a mobile device, the system comprising:

a memory device; and a processing device operatively coupled to the memory device, wherein the processing device is configured to execute computer-readable program code to:

provide a mobile application on a mobile device for retrieving, storing, and accessing resource distribution parameters, wherein the resource distribution parameters comprise product identification information, product pricing information, resource distribution amounts, and resource account information;

receive instructions for a resource distribution via the mobile application on the mobile device;

generate a communicable linkage between the mobile application and a third party system and access a database of updated product information, pricing information, resource distribution information, and account information via the communicable linkage, wherein the updated product information, pricing information, resource distribution information, and account information are stored on the third party system;

determine a resource distribution amount based on the resource distribution parameters or the updated product information, pricing information, resource distribution information, and account information;

activate a near field communication transmitter on the mobile device to initiate a near field communication;

generate a communicable linkage via the near field communication between the mobile device and a resource distribution instrument, with an embedded near field communication tag;

receive resource distribution credentials from the resource distribution instrument via the near field communication transmitter on the mobile device;

authenticate the resource distribution credentials; and
initiate a request for resource distribution for the
resource distribution amount.

2. The system of claim 1, wherein authenticating the resource distribution credentials further comprises verifying a resource account associated with the resource distribution credentials.

3. The system of claim 1, wherein authenticating the resource distribution credentials further comprises:
transmitting the resource distribution credentials to an entity; and
receiving, from the entity, confirmation of a resource account and real-time approval of the request for resource distribution.

4. The system of claim 3, further configured to:
receive an email address associated with the confirmed resource account; and
generate and transmit a verification message to the email address containing details of the resource distribution.

5. The system of claim 1, further configured to tokenize the resource distribution credentials received from the resource distribution instrument.

6. The system of claim 5, wherein authenticating the resource distribution credentials further comprises:
transmitting, via the mobile device, the tokenized resource distribution credentials to an entity; and
receiving, via the mobile device, a one-time authorization from the entity for the resource distribution amount based on the tokenized resource distribution credentials.

7. The system of claim 5, wherein tokenizing the resource distribution credentials further comprises:
encrypting the resource distribution credentials via the mobile device;
transmitting, via the mobile device, the encrypted resource distribution credentials to an entity for tokenization; and
receiving the tokenized resource distribution credentials from the entity.

8. A computer program product for resource distribution hub generation on a mobile device, the computer program product comprising at least one non-transitory computer-readable medium having computer-readable program code portions embodied therein, the computer-readable program code portions comprising:
an executable portion configured for providing a mobile application on a mobile device for retrieving, storing, and accessing resource distribution parameters, wherein the resource distribution parameters comprise product identification information, product pricing information, resource distribution amounts, and resource account information;
an executable portion configured for receiving instructions for a resource distribution via the mobile application on the mobile device;
an executable portion configured for generating a communicable linkage between the mobile application and a third party system and access a database of updated product information, pricing information, resource distribution information, and account information via the communicable linkage, wherein the updated product information, pricing information, resource distribution information, and account information are stored on the third party system;
an executable portion configured for determining a resource distribution amount based on the resource distribution parameters or the updated product information, pricing information, resource distribution information, and account information;
an executable portion configured for activating a near field communication transmitter on the mobile device to initiate a near field communication;
an executable portion configured for generating a communicable linkage via the near field communication between the mobile device and a resource distribution instrument, with an embedded near field communication tag;
an executable portion configured for receiving resource distribution credentials from the resource distribution instrument via the near field communication transmitter on the mobile device;
an executable portion configured for authenticating the resource distribution credentials; and
an executable portion configured for initiating a request for resource distribution for the resource distribution amount.

9. The computer program product of claim 8, wherein authenticating the resource distribution credentials further comprises verifying a resource account associated with the resource distribution credentials.

10. The computer program product of claim 8, wherein authenticating the resource distribution credentials further comprises:
transmitting the resource distribution credentials to an entity; and
receiving, from the entity, confirmation of a resource account and real-time approval of the request for resource distribution.

11. The computer program product of claim 10, further configured to:
receive an email address associated with the confirmed resource account; and
generate and transmit a verification message to the email address containing details of the resource distribution.

12. The computer program product of claim 8, further configured to tokenize the resource distribution credentials received from the resource distribution instrument.

13. The computer program product of claim 12, wherein authenticating the resource distribution credentials further comprises:
transmitting, via the mobile device, the tokenized resource distribution credentials to an entity; and
receiving, via the mobile device, a one-time authorization from the entity for the resource distribution amount based on the tokenized resource distribution credentials.

14. The computer program product of claim 12, wherein tokenizing the resource distribution credentials further comprises:
encrypting the resource distribution credentials via the mobile device;
transmitting, via the mobile device, the encrypted resource distribution credentials to an entity for tokenization; and
receiving the tokenized resource distribution credentials from the entity.

15. A computer-implemented method for resource distribution hub generation on a mobile device, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:

providing a mobile application on a mobile device for retrieving, storing, and accessing resource distribution parameters, wherein the resource distribution parameters comprise product identification information, product pricing information, resource distribution amounts, and resource account information;

receiving instructions for a resource distribution via the mobile application on the mobile device;

generating a communicable linkage between the mobile application and a third party system and access a database of updated product information, pricing information, resource distribution information, and account information via the communicable linkage, wherein the updated product information, pricing information, resource distribution information, and account information are stored on the third party system;

determining a resource distribution amount based on the resource distribution parameters or the updated product information, pricing information, resource distribution information, and account information;

activating a near field communication transmitter on the mobile device to initiate a near field communication;

generating a communicable linkage via the near field communication between the mobile device and a resource distribution instrument, with an embedded near field communication tag;

receiving resource distribution credentials from the resource distribution instrument via the near field communication transmitter on the mobile device;

authenticating the resource distribution credentials; and initiating a request for resource distribution for the resource distribution amount.

16. The computer-implemented method of claim 15, wherein authenticating the resource distribution credentials further comprises verifying a resource account associated with the resource distribution credentials.

17. The computer-implemented method of claim 15, wherein authenticating the resource distribution credentials further comprises:

transmitting the resource distribution credentials to an entity; and receiving, from the entity, confirmation of a resource account and real-time approval of the request for resource distribution.

18. The computer-implemented method of claim 15, further configured to tokenize the resource distribution credentials received from the resource distribution instrument.

19. The computer-implemented method of claim 18, wherein authenticating the resource distribution credentials further comprises:

transmitting, via the mobile device, the tokenized resource distribution credentials to an entity; and receiving, via the mobile device, a one-time authorization from the entity for the resource distribution amount based on the tokenized resource distribution credentials.

20. The computer-implemented method of claim 18, wherein tokenizing the resource distribution credentials further comprises:

encrypting the resource distribution credentials via the mobile device;

transmitting, via the mobile device, the encrypted resource distribution credentials to an entity for tokenization; and receiving the tokenized resource distribution credentials from the entity.

* * * * *